(12) United States Patent
Blue

(10) Patent No.: US 9,108,384 B2
(45) Date of Patent: Aug. 18, 2015

(54) DECORATIVE FASTENER

(71) Applicant: Nancy Louise Blue, Concord, CA (US)

(72) Inventor: Nancy Louise Blue, Concord, CA (US)

( * ) Notice: Subject to any disclaimer, the term of this patent is extended or adjusted under 35 U.S.C. 154(b) by 302 days.

(21) Appl. No.: 13/651,159

(22) Filed: Oct. 12, 2012

(65) Prior Publication Data

US 2013/0273304 A1 Oct. 17, 2013

Related U.S. Application Data

(60) Provisional application No. 61/686,697, filed on Apr. 11, 2012.

(51) Int. Cl.
*B32B 3/06* (2006.01)
*A44B 18/00* (2006.01)
*B32B 3/28* (2006.01)
*E04C 2/12* (2006.01)

(52) U.S. Cl.
CPC .............. *B32B 3/06* (2013.01); *A44B 18/0011* (2013.01); *B32B 3/28* (2013.01); *E04C 2/12* (2013.01); *Y10T 428/24008* (2015.01)

(58) Field of Classification Search
CPC ..... B32B 3/06; B32B 3/28; Y10T 428/24008; A44B 18/0011; E04C 2/12
USPC .................................................. 428/99, 98, 53
See application file for complete search history.

(56) References Cited

U.S. PATENT DOCUMENTS

| | | | |
|---|---|---|---|
| D390,960 S * | 2/1998 | Ross | D24/189 |
| 7,661,636 B1 * | 2/2010 | Burke | 248/102 |
| 2011/0016616 A1 * | 1/2011 | Crouch | 2/338 |
| 2012/0234042 A1 * | 9/2012 | Chase et al. | 63/1.18 |

* cited by examiner

*Primary Examiner* — Brent O'Hern

(57) ABSTRACT

The decorative fastener includes a base fitted with eyes or receptacles on the underside of the base and one or two straps that protrude from the lower portion of the base underside and which are fitted with hooks on their exposed ends. The straps wrap back over themselves, around any particular item of wear, and fasten using the hooks on the straps and the eyes on the underside of the base. The decorative fastener may also include a plurality of interchangeable decorative disc options, or removable strap options, thus allowing the wearer to change decorations easily and inexpensively.

9 Claims, 4 Drawing Sheets

DECORATIVE FASTENER

CROSS-REFERENCE TO RELATED APPLICATIONS

This application is based upon and claim priority from U.S. provisional application Ser. No. 61/686,697 filed Apr. 11, 2012.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING DISC APPENDIX

Not Applicable

BACKGROUND OF INVENTION

The invention relates, in general, to the field of fashion accessories. It is a versatile decorative fastener suitable for attachment to many different articles of clothing, mainly, but not limited to, shoes.

The invention is not a permanent accessory and may be removed from one article of wear and attached to another item. The invention includes an optional feature that may enable the decoration itself be changed and replaced with another.

DESCRIPTION OF THE PRIOR ART

The use of decorative accessories with interchangeable features for footwear and other items of wear, is known in the prior art.

By way of example, U.S. Pat. No. 6,769,204 to Phillips discloses a sandal system. U.S. Pat. No. 5,355,698 to Edmark discloses an interchangeable decorative ornament.

Although these accessory devices are satisfactory for their particular purposes, they do not enable a user to have the versatility to use them on a plurality of applications such as an abundance of shoe styles, scarves, purses, clothing, hair ponytails and hatbands, already owned by the wearer.

SUMMARY OF THE INVENTION

Individuals prefer to have a selection of ornamental fashion adornments when preparing to dress for social gatherings; however, they may be prohibited from purchasing numerous fashion items due to financial constraints. Therefore, a need exists to supply the public with inexpensive choices. Accessories that are removable, as well as, interchangeable, (i.e. a decorative element that is able to be changed with another decorative element within the fashion article itself) is highly desired. In addition, providing accessories that may be used on more than one type of clothing, accessory or footwear is even more desirable.

Currently, there are products which allow a wearer to purchase a specialized decoration that requires an expensive, specialized shoe, or other specific article, in order to attach the decoration before wearing; however, they limit the wearer to using the decoration only on that specific article because the decorations are not adaptable for attachment to any other article of clothing or accessory.

To eliminate the need to purchase expensive specialized items of wear, the decorative fastener has the ability to be worn on items of which an individual already owns. In addition, the decorative fastener has the option to be manufactured with the ability to replace one topical decoration with another.

The two-strap attachment device of the decorative fastener is intended to make using the decorative fastener on flip flops and strappy sandals easy. However, the decorative fastener may also be manufactured using only one strap. Offering a single strap option makes using the decorative fastener on items other than flip flops and strappy sandals easier for the consumer, although the basic purpose of the decorative fastener remains the same.

The decorative fastener consists of a base manufactured of a hard material, whether composite, metal, plastic or some other material, or a soft, yet firm material. The underside of the base has one or two straps extending from it. These straps are fitted with attachment devices at the exposed ends. The straps wrap back over themselves and the attachment device at the end of the straps join with their attachment counterpart; also located on the underside of the base. The straps wrap around any number of articles of wear to provide an element of fashion embellishment.

The top portion of the base may, or may not be manufactured with the capability to change-out a decorative piece. In other words; the base may be manufactured with a permanent embellishment or decoration, however; an embodiment of the decorative fastener includes the option to manufacture the top portion of the base with a coupling device that allows for a decorative piece to be removed and replaced with another decorative piece.

The embodiment of the decorative fastener includes the option to manufacture the base, or disc with the capability to completely remove the straps from the underside of the disc altogether, allowing them to be attached to the underside of another base, or disc that has a different decorative element on the topside.

The decorative fastener is a lightweight addition to a wearer's wardrobe. While worn, the owner will not be aware of extra weight or discomfort. It will be manufactured for durability so the wearer may expect to use it for years.

BRIEF DESCRIPTION OF THE DRAWINGS

For full clarification of the decorative fastener, reference is made to the following description of the accompanying drawings:

FIG. 2 also shows an option for a three dimensional decoration on the top portion of the base.

DETAILED DESCRIPTION OF THE INVENTION

Figure 1:
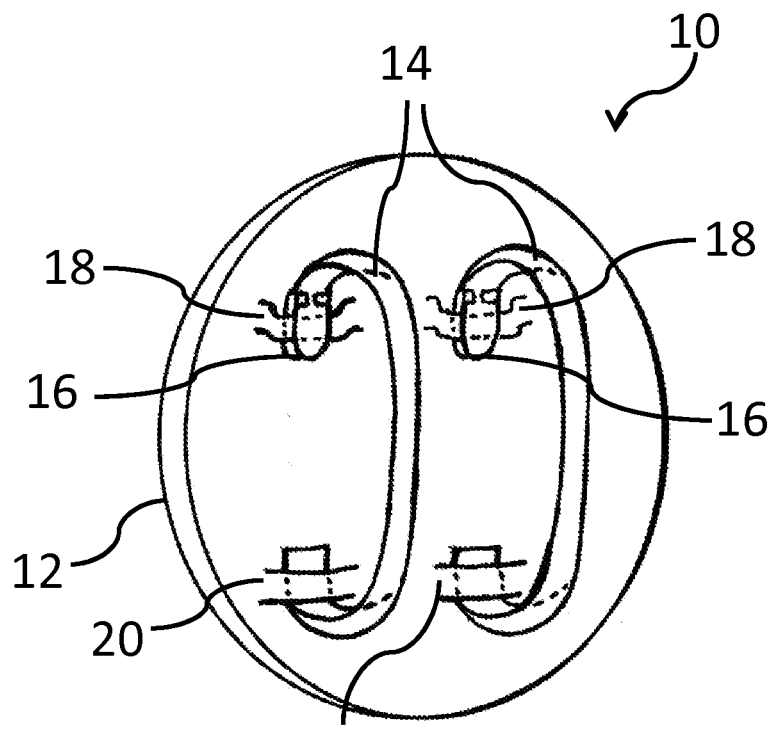
FIG. 1 is a rear perspective view of a permanent strap version of the decorative fastener which is located and affixed to the underside of a decorated or plain base, showing how the device appears when the attachment pieces are connected.

FIG. 1 is a view of an embodiment of a decorative fastener 10. The decorative fastener 10 comprises a base 12, two parallel placed straps 14, a hook 16 at the exposed end of each strap 14, two raised eyes 18 set side by side at the top portion of the underside of the base.

An embodiment of the base 12 may be manufactured of a hard material, whether composite, metal, plastic or some other material, or a flexible, yet firm material that may comprise any decorative shape and may have a decorative design permanently applied, or embedded upon the top portion. Two straps, placed in a parallel formation 14 protrude from slotted openings 20 which are then clamped to secure the straps 14 to the underside of the base 12. Each of the straps 14 has a hook 16 affixed to their exposed ends. The straps 14 fold back upon themselves in order that the hooks 16 may be connected to the raised eyes 18 which protrude from the underside of the base 12 thus creating the shape of a loop. It should be understood that the straps 14 may be made of any material; and, by way of example and not limitation, may include; whether singularly or in combination, rubber, silicone and polyester, or any other material known to those skilled in the art. Further, it should be understood that the raised eyes 18 may or may not be a formation of the actual base 12. By way of example; the raised eyes 18 may be separate pieces that are affixed to the base 12.

Finally, other means for fastening the exposed ends of the straps 14 to the base 12 that are well known to a person of ordinary skill in the art may be used in place of the hooks 16 and eyes 18. For example, hook and loop tape, two sets of male and female snap fasteners, hooks and rubber loop combinations, or any other mechanism known to those skilled in the art.

Any means for fastening the unexposed ends of the straps 14 to the base 12 that are well known to a person of ordinary skill in the art may be used in place of slotted, then clamped openings 20 in the base 12. For example, the straps 14 may be held fast using a strong adhesive or covering that would ensure a tight hold.

In addition to producing the decorative fastener 10 with two parallel straps 14, it may also be produced using only a single strap 14. Producing an optional decorative fastener 10 with a single strap 14 will make it easier for the user to attach the device to certain articles of wear.

Figure 2:
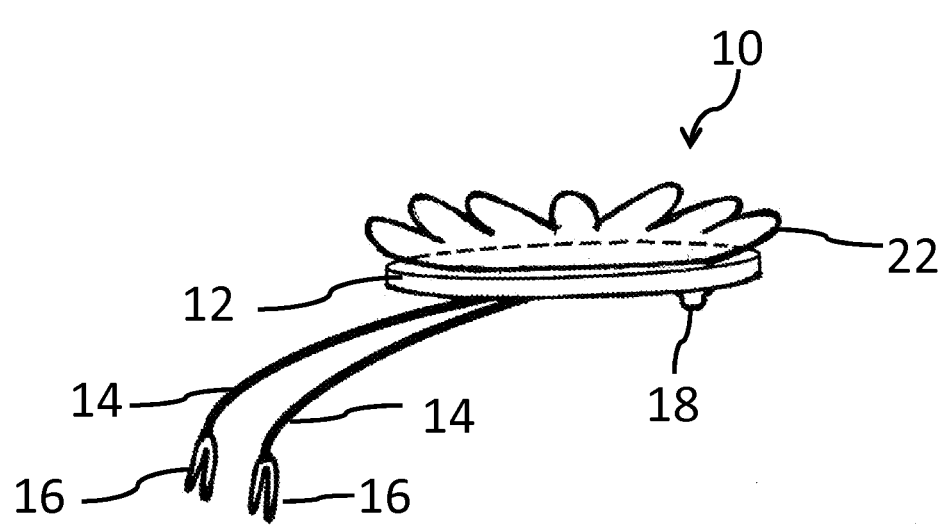
FIG. 2 is a side perspective view of a permanent strap version of a decorated or plain base, showing the attachment device on the underside as it lies while the attachment pieces are not connected.

FIG. 2 is a side perspective view of the attachment device showing the base 12, the two parallel straps 14, the hooks 16 attached at the exposed end of the straps 14, the raised eyes or receptacles 18 and an example of a decorative feature 22, which may or may not be applied to the top portion of the base 12.

Figure 3:
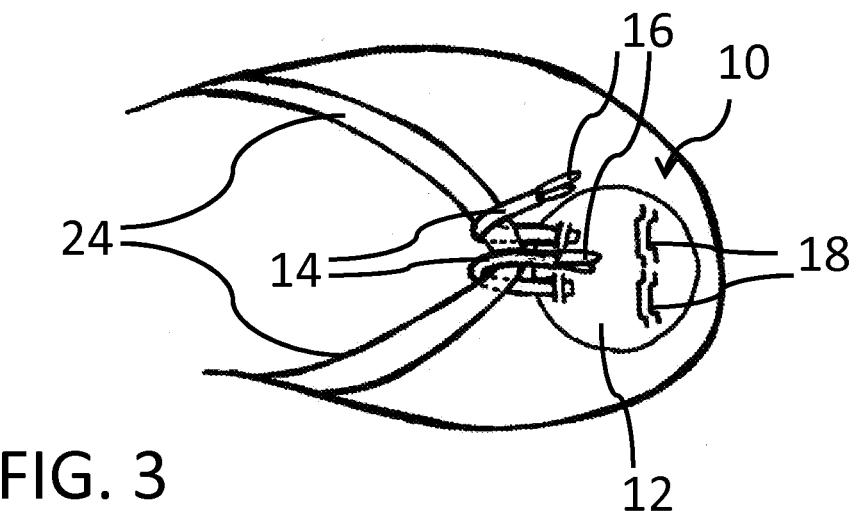
FIG. 3 is a top planar view of the decorative fastener showing how it is to be wrapped around the straps of a sandal.

FIG. 3 is a top planar view of the underside of the decorative fastener 10 showing the two, parallel straps 14 as they wrap around sandal straps 24. The hooks 16 will attach to the raised eyes 18 as shown in FIG. 1.

Figure 4:
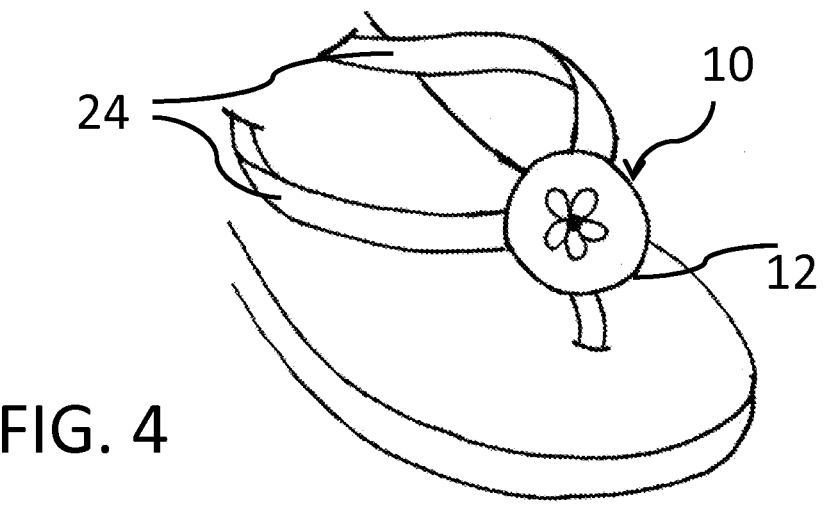
FIG. 4 is a top perspective view of the topside of the decorative fastener's base showing how it looks on a sandal after the attachment device is completely fastened.

FIG. 4 is top perspective view showing the decorated side of the base 12 as it sits completely affixed to the sandal straps 24.

Figure 5:
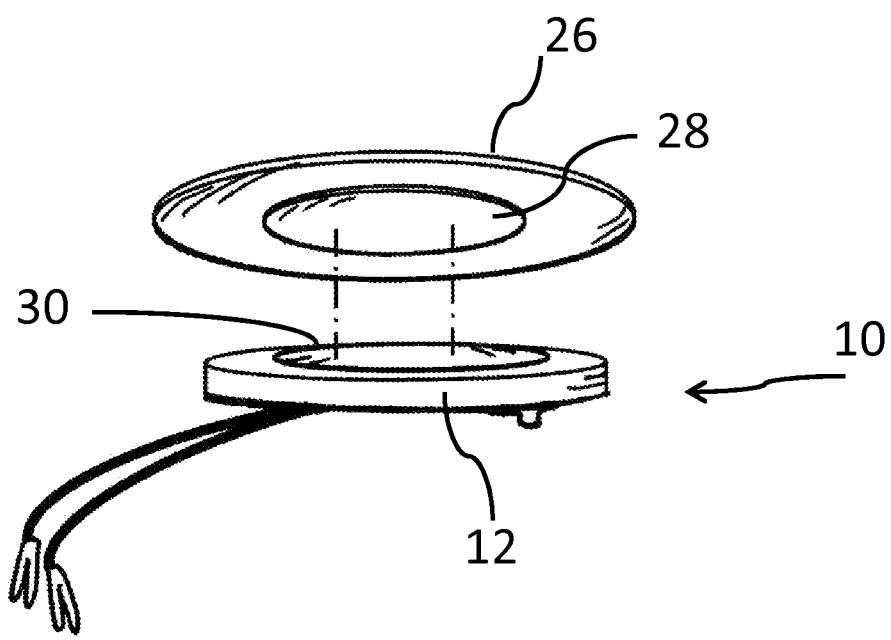
FIG. 5 is a side perspective view of the decorative fastener's base and attachment device with an added optional feature of an interchangeable decorative disc that may be removed from the top portion of the base and replaced with another.

FIG. 5 is a side perspective view of the decorative fastener 10 with an optional, interchangeable decorative disc feature 26. The interchangeable disc 26 could be fitted with a strong magnet 28 on the underside. The base 12 could be made of metal or fitted with a strong, metal piece 30 which would attract to the magnet 28 on the interchangeable disc 26. Other means for fastening the interchangeable disc 26 to the base 12 that are well known to a person of ordinary skill in the art may be used in place of the magnet 28 and metal piece 30. For example, the interchangeable disc 26 and the base 12 may comprise hook and loop tape, a male and female snap fastener, a male and female screw assembly, a hook and eye configuration, a post and clasp assembly, or any other mechanism known to those skilled in the art.

Figure 6:
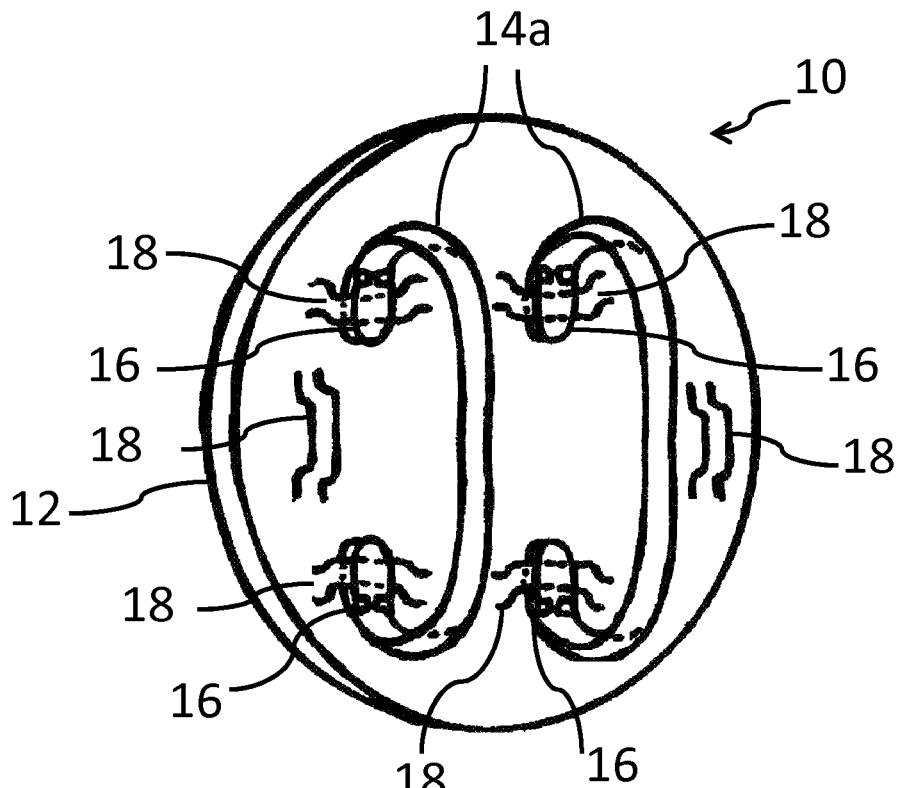
FIG. 6 is a rear perspective view of a removable strap version of the attachment device which is located on the underside of a decorative or plain base showing how the device appears when two, equally sized straps are placed in parallel formation and the straps are connected to the base.

FIG. 6 shows the embodiment of a decorative fastener 10 wherein the straps 14a of the device have the capability of being completely removed from a base 12.

The base 12 may comprise any decorative shape and may have a decorative design permanently applied, or embedded upon the top portion. Said base 12 comprises one set of two eyes 18, or some other fastener set side by side at the upper portion of the underside of the base 12 and one set of two eyes 18, or some other fastener, set side by side at the lower portion of the underside of the base 12. Said base 12 may also comprise one eye 18, or some other fastener on the left portion of the underside of the base 12 and one eye 18 or some other fastener on the right portion of the underside of the base 12.

Two, separate straps of equal length 14a are fitted with hooks 16 or some other fastener on each exposed end. One hook 16 at one end of each strap 14a would connect with one of the eyes 18 at the upper portion of the underside of the base 12 and one hook 16 at the opposite end of each strap 14a would connect with one of the eyes 18 at the lower portion of the underside of the base 12 creating loops that would wrap around the straps of sandals or some other item of wear.

Figure 7:
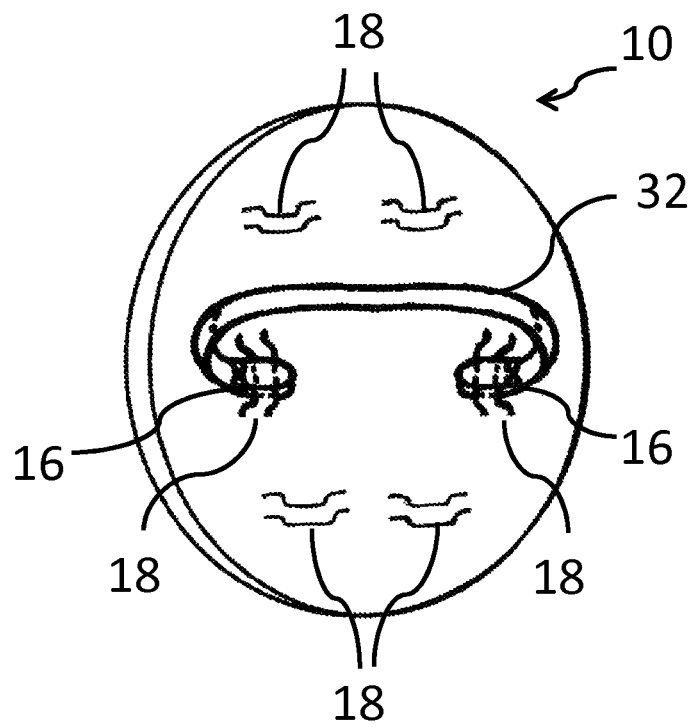
FIG. 7 is a rear perspective view of the removable strap version of the attachment with the two equally sized straps removed and a singular, removable strap put in place and connected.

FIG. 7 shows the embodiment of the attachment device 10 using only one, completely removable strap 32. Said strap 32 is fitted with hooks 16, or some other fastener on each exposed end. One hook 16 at one end of the strap 32 would connect with the eye 18 on the left portion of the underside of the base 12 and the hook 16 on the other end of the strap 32 would connect with the eye 18 on the right portion of the underside of the base creating one loop that would wrap around an item that may require only one strap 32 such as a scarf or hair ponytail.

Further, it should be understood that the decorative fastener as shown in FIG. 6 and FIG. 7 may have the same interchangeable decorative disc options as shown in FIG. 5.

Although all versions of the decorative fastener have been described in detail, it should be understood that various changes, substitutions and alterations may be made hereto without departing from the spirit and scope of the invention as defined by the appended claims.

I claim:

1. A decorative fastener for attaching to a sandal comprising:
   a) a base having a topside and an underside;
   b) two substantially parallel straps made from rubber or silicone or polyester, one end of each strap permanently attached to the underside of the base;
   c) a hook and eye assembly for attaching non-permanently attached ends of the straps to the underside of the base.

2. The decorative fastener of claim 1, wherein a decorative item is affixed to the topside of the base.

3. The decorative fastener of claim 2, wherein the decorative item is a decorative disc.

4. The decorative fastener of claim 3, wherein the decorative disc is interchangeable with another decorative disc.

5. The decorative fastener of claim 2, wherein a decorative item is affixed to the topside of the base by a magnet.

6. The decorative fastener of claim 1, wherein the base is disc shaped.

7. The decorative fastener of claim 1, wherein the base has a top portion with a coupling device that allows a decorative piece to be removed and replaced with another decorative piece.

8. The decorative fastener of claim 1, wherein the base is manufactured with a permanent embellishment or decoration.

9. A combination of a decorative fastener and a sandal comprising:
   a decorative fastener comprising:
   a) a base having a topside and an underside;
   b) two substantially parallel straps made from rubber or silicone or polyester, one end of each strap permanently attached to the base underside;
   c) a hook and eye assembly for attaching non-permanently attached ends of the straps to the underside of the base; and wherein the fastener is attached to the sandal.

* * * * *